United States Patent [19]
Tilliette

[11] 3,909,351
[45] Sept. 30, 1975

[54] NUCLEAR REACTOR
[75] Inventor: Zephyr Tilliette, Chatillon-sous-Bagneux, France
[73] Assignee: Commissariat a l'Energie Atomique, Paris, France
[22] Filed: May 2, 1973
[21] Appl. No.: 356,283

[30] Foreign Application Priority Data
May 2, 1972 France .............................. 72.15555

[52] U.S. Cl. ................................................ 176/87
[51] Int. Cl. ............................................. G21c 15/00
[58] Field of Search .................... 176/87, 55, 60, 65

[56] References Cited
UNITED STATES PATENTS

| | | | |
|---|---|---|---|
| 3,251,747 | 5/1966 | Franke et al. | 176/65 |
| 3,371,017 | 2/1968 | Coast et al. | 176/87 |
| 3,410,752 | 11/1968 | Dell | 176/60 |
| 3,461,034 | 8/1969 | Fortescue | 176/87 |
| 3,470,066 | 9/1969 | Livsey et al. | 176/60 |

*Primary Examiner*—Benjamin A. Borchelt
*Assistant Examiner*—C. T. Jordan
*Attorney, Agent, or Firm*—Cameron, Kerkam, Sutton, Stowell & Stowell

[57] ABSTRACT

A nuclear reactor and especially a high-temperature reactor in which provision is made within a pressure vessel for a main cavity containing the reactor core and a series of vertical cylindrical pods arranged in spaced relation around the main cavity and each adapted to communicate with the cavity through two collector ducts or headers for the primary fluid which flows downwards through the reactor core.

Each pod contains two superposed steam-generator and circulator sets disposed in substantially symmetrical relation on each side of the hot primary-fluid header which conveys the primary fluid from the reactor cavity to the pod, the circulators of both sets being mounted respectively at the bottom and top ends of the pod.

7 Claims, 3 Drawing Figures

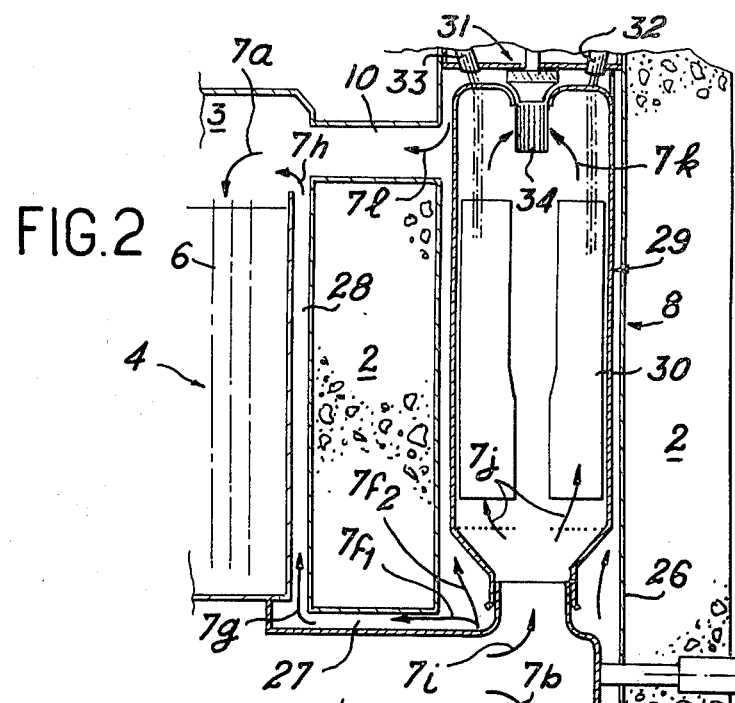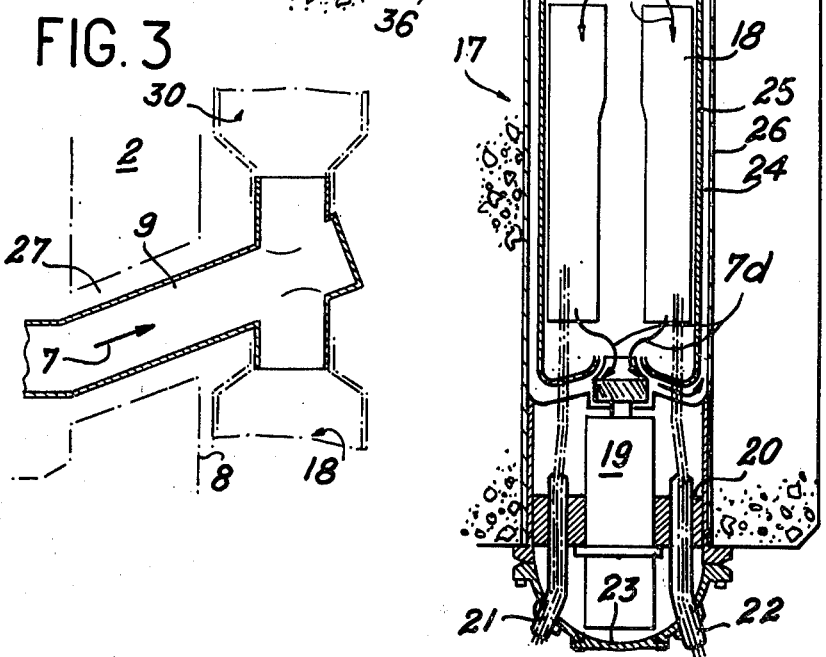

NUCLEAR REACTOR

This invention relates to nuclear reactors and is primarily applicable to gas-cooled reactors, especially of the so-called high-temperature type in which cooling of the core consisting of an assembly of prismatic fuel elements or of spheres contained in a tank is carried out by means of downward vertical circulation of a gaseous fluid and especially helium. The invention is also applicable to other types of reactors, in particular to fast reactors which are cooled either by carbon dioxide gas or helium.

Reactors of this type are constructed in accordance with a number of known design concepts. A typical arrangement consists of a pressure-resistant shield structure formed by a thick-walled concrete vessel which ensures that the surrounding atmosphere is suitably protected against radiations emanating from the fuel elements of the reactor core, the core being placed within a main cavity which is located in the vertical axis of the pressure vessel. Said cavity is connected by means of lateral ducts to a group of vertical cylindrical compartments or so-called pods which extend through the pressure vessel and are uniformly spaced about the axis of this latter. Two ducts are provided for each compartment, are so arranged as to open in one case into the main cavity below the reactor core and in the other case above this latter, and serve respectively as headers for the coolant or primary fluid. The lower duct collects the hot fluid derived from the reactor core and the upper duct returns the same fluid after cooling towards the main cavity.

A steam generator for a secondary fluid which is different from the primary fluid and usually consists of water is mounted within each pod substantially at the same vertical level as the reactor core. Said secondary fluid is circulated within heat-exchanger tubes, the external surface of of which is in contact with the primary fluid. Circulation of said primary fluid through the tube bundle of the steam generator is carried out by means of a circulator which can be mounted either beneath the steam generator or above this latter as is more generally the case. The design function of said circulator is to draw-in the primary fluid as this latter passes out of the steam generator and thus return it to the reactor core in the cool state.

This known arrangement is considered to have the advantage of providing fairly high flexibility or operation and to permit disassembly of the steam generator and of the associated circulator through the pod ends which are normally closed by leak-tight closure plates or covers. This entails the need for a general structural design of the reactor which is favorable to some extent both to extrapolation to high powers and to overall reduction of capital outlay by virture of the fact that, all other things being equal, the volume and particularly the height of the concrete pressure vessel are smaller than in other design solutions of the prior art, for example those in which the steam generators are placed directly beneath the reactor core within the main cavity.

There are, however, certain disadvantages attached to the design concept just mentioned, especially by reason of the fact that, in order to obtain a circulation of the primary fluid in counterflow to the secondary fluid which circulates upwards within the steam-generator tubes, which is highly favorable and corresponds to the normal direction of evaporation of said secondary fluid, the primary fluid must be caused to follow a complementary path through a baffle mounted within the pod around the steam generator with a view to ensuring that the primary fluid derived from the bottom header in which it is at its maximum temperature accordingly passes downwards through the steam generator and not in the opposite direction. Moreover, taking into account the large size of the units to which this design inevitably leads in practice, this solution is not conducive to regulation which permits operations of the reactor on a low or very low load. Finally, in addition to the pods which contain the steam generators, the known arrangement considered in the foregoing entails the need for further cavities or pods which are intended to accommodate emergency cooling loop systems for the removal of residual power in the event of fault conditions or damage to the main primary fluid circuit; and this further complicates the construction of the installation as a whole.

The nuclear reactor in accordance with the present invention is of the type recalled above and retains the essential advantages of known designs while circumventing the disadvantages of these latter, especially in regard to the arrangement of the steam-generator and circulator sets within the pods which surround the reactor core cavity and communicate with this latter. In addition, however, the solution proposed by this invention offers a large number of specific advantages, especially in the high-power range, together with considerably enhanced reliability of operation and an efficiency which is maintained at a high value.

To this end, the reactor under consideration is characterized in that each pod contains two superposed steam-generator and circular sets which are placed in substantially symmetrical relation on each side of the hot primary-fluid header which conveys said fluid from the reactor cavity to the pod, the circulators of both sets being mounted respectively at the bottom and top ends of said pod.

According to one advantageous feature, the circulator which is mounted at the bottom end of the pod returns the primary fluid after said fluid has passed through the steam generator which is associated therewith in the same set into an annular space formed between said steam generator and the internal wall of the pod.

In a first embodiment of the invention, the annular space through which the primary fluid flows after being returned by the circulator mounted at the bottom end of the pod communicates with a duct which surrounds the hot primary-fluid header, said header being in turn adapted to communicate through the region formed between the periphery of the reactor core and the pressure vessel wall with the upper portion of the main cavity above said core substantially at the level of the header for the cold primary fluid which is derived from the upper portion of the pod.

In another embodiment, the annular space communicates within the pod with a similar annular space formed between the pod wall and the steam generator of the upper set, the primary fluid which is circulated within said annular spaces being mixed with the fluid which is returned by the circulator mounted at the top end of the compartment before passing into the cold primary-fluid header.

Preferably, each steam generator comprises a heat exchanger formed by a bundle of circulation tubes joined to a duct or to a sub-header for the supply of secondary fluid and to a duct or to a sub-header for the discharge of the steam produced by said fluid, said ducts or sub-headers being disposed vertically around the circulator which is associated with the steam generator in each set. As a further preferable feature, the outlet duct for the secondary-fluid steam of each steam generator is connected to a power-recovery installation comprising a turbo-alternator or two turbo-alternators connected in one case to the lower heat exchangers of the pods and in the other case to the upper heat exchangers or to a plurality of separate turbo-alternators operating in parallel, the distribution of the rated power of the heat exchangers being adapted to requirements.

Finally, in another embodiment, the two steam-generator and circulator sets of each pod form in conjunction with the hot and cold primary-fluid headers two separate circuits or loops which operate in parallel, the circulator which is mounted at the top end of the pod and if necessary the circulator which is mounted at the bottom end being provided with a closure and aerodynamic control device in order that the primary fluid should be prevented from flowing in the opposite direction into the loop which has been withdrawn from service at the time of shutdown of the upper steam-generator and circulator set.

Further characteristic features of a nuclear reactor as constructed in accordance with the invention will become apparent from the following description of a number of practical examples which are given by way of indication without any limitation being implied, reference being made to the accompanying drawings, wherein:

FIG. 2 is a sectional view to a larger scale showing a pod of the same reactor as constructed in accordance with another embodiment of the invention;

FIG. 3 is a detail view illustrating an alternative design for the arrangement of the primary-fluid header.

Figure 1:
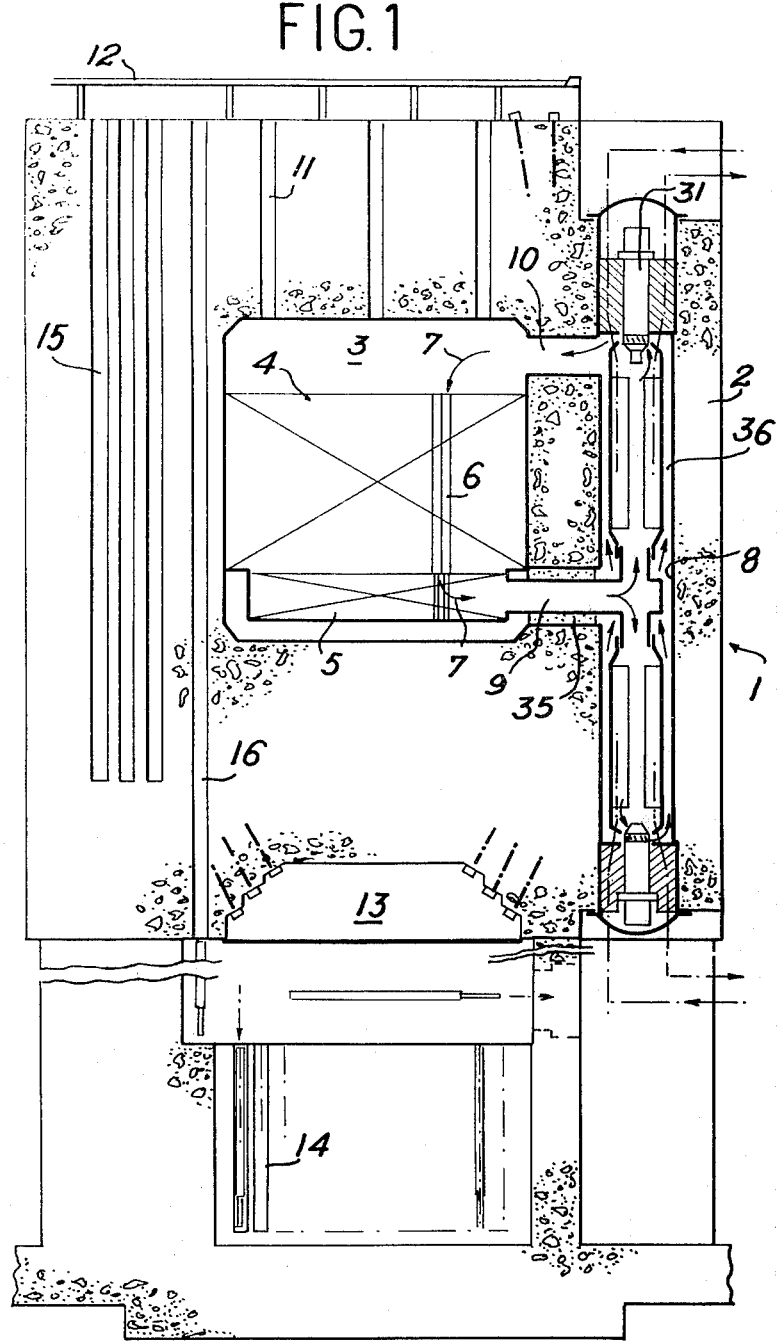
FIG. 1 is a diagrammatic vertical sectional view of a reactor provided with compartments or so-called pods containing two steam-generator and circulator sets in accordance with the first embodiment of the invention.

The reactor which is illustrated diagrammatically in FIG. 1 and designated by the reference numeral 1 is known as a "high-temperature reactor" and utilizes helium as primary coolant. This reactor is essentially composed of a thick-walled concrete structure 2 which forms a biological shield and pressure vessel, a cavity 3 or main cavity in which the reactor core or active portion 4 being placed within said pressure vessel and located substantially along the vertical axis of this latter. The reactor core rests on a support structure 5 and is formed by an assembly of fuel elements 6 of generally prismatic shape, it being understood that the actual design of these fuel elements has no direct bearing on the object of the invention; in particular, the reactor core could be constituted by spherical fuel elements or spheres contained in a suitable tank in accordance with a technique which is also known. Within the main cavity 3, the primary coolant flows downward through the reactor core in a direction which is shown diagrammatically by the arrows 7.

In accordance with an arrangement which is also conventional in reactors of this type, the main cavity 3 is surrounded by a series of cylindrical pods which are located on a vertical axis and only one of which is shown at 8 in the drawings. Said pods are disposed around the reactor core and either spaced at uniform intervals with respect to this latter or judiciously spaced in a different manner and are intended to accommodate steam-generator and circulator sets for carrying out heat transfer between the primary and secondary fluids and the circulation of the primary coolant; to this end, each pod 8 communicates with the main cavity 3 containing the reactor core by means of two ducts 9 and 10 respectively which is located at the lower end and at the upper end of the cavity 3. The duct 9 forms a header for the hot fluid which has passed through the reactor core and has its opening substantially at the center of the pod 8. The duct 10 which constitutes the cold fluid header is located at the top portion of the pod and has its opening in the cavity 3 above the reactor core 4.

Finally, there are shown very diagrammatically in FIG. 1 a number of conventional arrangements which are necessary for the operation of the reactor, such as a series of vertical channels 11 which provide a communication between the top of the main cavity 3 and the top of the pressure vessel 2, especially in order to permit introduction or withdrawal of the fuel elements into or from the reactor core by means of a handling machine (not shown in the drawings) which is capable of moving on a refuelling floor 12 placed above the pressure vessel.

Provision is made at the lower end of said pressure vessel and beneath the cavity 3 for a sub-core room 13 which is intended to house canisters 14 for storing irradiated fuel elements which have been withdrawn from the reactor core. The sub-core room 13 can also serve to carry out the operations involved in discharging said fuel elements in order to convey these latter to a separate installation for reprocessing irradiated fuel. In the case just mentioned, storage of the fuel is carried out by means of vertical wells 15 formed within the thickness of the pressure vessel structure. Operations involved in receiving and conditioning fresh fuel can also be performed witihin the sub-core room 13. A communication between the sub-core room 13 and either the handling machines which move over the refuelling floor 12 or the fuel storage devices or vertical wells 15 is established through the entire pressure vessel structure by means of connecting ducts 16 which can serve if necessary to store fuel elements or any other reactor components.

FIG. 2 is a view to a larger scale showing the constructional detail and equipment of one of the pods 8 which are disposed around the main cavity 3 of the reactor. In fact, in accordance with the invention, each pod 8 is equipped with two steam-generator and circulator sets which are practically identical but can be different if necessary both from the point of view of thermal performance and practical design of components. These two sets are superposed and so arranged as to be in substantially symmetrical relation to each other and with respect to the axis of the duct 9, said duct being intended to form a header for the hot primary fluid which has passed through the reactor core and to establish a communication between the pod under consideration and the bottom portion of the main cavity 3. The first steam generator and circulator set which is designated by the reference numeral 17 is located at the lower end of the pod 8 below the level of the reactor core 4. Said first set consists of a heat exchanger 18 of conventional type which is constituted by a tube bundle for the circulation of a secondary fluid usually consisting of water and which is preferably not provided with a steam resuperheating circuit, and by a circulator 19 which is mounted at the lower end of the pod beneath the heat exchanger.

In one possible mode of assembly, the circulator 19 aforesaid is mounted on a support frame 20 which performs the function of a flow limiter and of a neutron shield, said support frame 20 being traversed by ducts 21 and 22. The duct 21 serves to convey the secondary fluid to the tube bundle of the heat exchanger 18 and the duct 22 serves to discharge the steam produced by heat exchange with the hot primary fluid derived from the header 9; said primary fluid thus flows along the shortest path downwards within the heat exchanger 18 whiles the secondary fluid passes upwards through the tube bundle, that is to say in the normal direction of vaporization. A seal cover 23 ensures leak-tightness of the primary circuit with respect to the exterior of the pressure vessel and is provided with penetration passages for the duct 21 and 22 through the primary containment structure, the continuity of which is ensured by means of the seal cover. It is thus possible to gain access to the circulator 19 by means of either total or partial disassembly of said cover. It should be noted that the circulator can also be readily removed independently of the support frame 20 through the lower end of the pod by providing access to the heat exchanger 18 which is in turn removable and capable of being withdrawn through the end of the pod into the corresponding portion of the sub-core room 13.

As shown in the drawings, the flow of primary fluid within the reactor-core circuit or loop and then within the steam-generator and circulator sets of the pod 8 is indicated by the arrows 7. In particular, it is apparent that the primary fluid which is present at the top portion of the main cavity 3 above the reactor core passes through this latter in the direction shown by the arrow $7a$, then passes through the header 9 to be divided within the pod 8 into two streams, one of which is directed towards the heat exchanger 18 and the circulator 19 as indicated diagrammatically by the arrow $7b$. This fraction of the primary fluid passes in the direction of the arrows $7c$ through the tube bundle of the heat exchanger where it is cooled and ensures vaporization of the secondary fluid, then in the direction of the arrows $7d$, is drawn-in by the rotating assembly of the circulator 19 which then returns said fraction into an annular space 24 formed between the outer shell 25 of the steam generator 18 and a liner tube 26 which surrounds the internal wall of the pod 8. At the upper end of said annular space 24, the cooled primary fluid passes in the direction of the arrows $7e$ behind the header 9 and then, in the example considered, is subdivided into two streams represented diagrammatically by the arrows $7f_1$ and $7f_2$. The stream $7f_1$ passes into an annular region 27 formed externally of the header 9, then flows upwards in the direction of the arrows $7g$ into a space 28 formed between the reactor core 4 and the opposite wall of the pressure vessel. As shown by the arrow $7h$, said stream finally reaches the top of the cavity 3 and meets the cold primary fluid as this latter is returned into the cavity through the header 10.

Within the duct 9 which supplies the steam generator and circulator sets with hot primary fluid, that fraction of said fluid which passes into the pod is subdivided as indicated in the foregoing into two streams, one of which is represented diagrammatically by the arrow $7b$ and passes through the steam generator and circulator set 17 which is located at the lower portion of the pod whilst the other stream is indicated by the arrow $7i$ and supplies the second set 29 which is located above the first. Said second set is equipped with a heat exchanger 30 and a circulator 31 in superposed relation in the same manner as the first set. These two portions of the set are of practically identical design and disposed symmetrically with respect to the heat exchanger 18 and the circulator 19 on each side of the axis of the header 9. The fraction of the hot primary fluid which circulates within said second set passes in the direction of the arrows $7j$ through the tube bundles of the heat exchanger 30 which are in turn connected to two ducts 32 and 33 respectively which serve to supply said heat exchanger with secondary fluid and to discharge the vapor which is produced. The cooled primary fluid which passes out of the heat exchanger 30 is drawn in the direction of the arrows $7k$ into the circulator 31, then returned through this latter in the direction of the arrows $7l$ into the upper header 10 where it meets that fraction of the same fluid which is derived from the circulator 19 and is discharged from the annular space 24 in the direction of the arrow $7f_2$ but has not been diverted into the region 27.

Within the second set 29, the circulation of the primary fluid is carried out in the upward direction in constradistinction to the first set, thereby causing the secondary fluid to follow a downward path opposite to the normal direction of vaporization by virtue of the positions of the ducts 32 and 33 and of the necessary countercurrent flow. Although it applies to no more than one-half the flow of primary fluid, the requirement just mentioned would appear to be troublesome but does not, however, introduce any considerable disadvantage and is largely offset by the symmetry of assembly of the two sets, the simplicity of the flow path of the primary fluid, the design of the steam generator and the possibility, as will be explained hereinafter, of employing the two sets only in the case of appreciable load factors of the reactor, only the lower set of each pod being put into service at low loads. In this last-mentioned case, the circulator 31 is advantageously fitted with a closure device 34 which makes it possible in the event of withdrawal of the corresponding set from service to prevent circulation of the primary fluid in the opposite direction from the cavity 3 through the header 10.

Said closure device can also serve to carry out aerodynamic adjustments for operation in parallel involving both sets 17 and 29. The lower heat-exchanger and circulator set can also be provided with closure devices for shutting-off or regulating the flow of primary fluid.

In the embodiment which has been more especially set forth in the foregoing, the primary fluid discharged by the circulator 19 which is mounted in the lower portion of the pod 8 is returned at least in part around the hot fluid header 9. In another alternative embodiment which is shown diagrammatically in FIG. 1, the annular region 27 which is used for the partial return of the cold fluid is dispensed with and closed-off by means of an element 35. The primary fluid which is discharged by the circulator 19 thus passes into the space 24 between the shell 25 of the heat exchanger 18 and the liner tube 26 of the pod, then within the upper portion into a similar space 36 between the heat exchanger 30 and the same liner tube. The entire quantity of fluid discharged by the circulator 19 is thus mixed with the fluid discharged by the circulator 31 before returning to the cavity 3 via the top header 10.

In the foregoing examples, the header 9 is shown with a substantially horizontal axis; as an alternative form illustrated in FIG. 3, said header can have a certain degree of inclination. In some cases, this arrangement makes it possible to limit the total height of the two steam generator and circulator sets which are housed within each pod 8 and also the height of the pressure vessel 2 if necessary. In all cases, the arrangement of the pods results in two primary fluid circuits or loops which operate in parallel either at the same time or separately, depending on the thermal power to be absorbed.

The constructional arrangements which are contemplated in accordance with the invention provide in themselves a large number of advantages in addition to those which are inherent in the type of reactor proposed and in the structural design of a pressure vessel having a central cavity and lateral cylindrical pods having vertical axes and containing the equipment units (heat exchangers and circulators) for heat transfer between the primary fluid and the secondary fluid. Such advantages include ease of disassembly of said equipment units, limitation of the total volume of the pressure vessel, simplicity of construction, utilization of the sub-core room located beneath the reactor for storage or preferably for conditioning of the fuel, in which case the fuel is stored within the pressure vessel itself and liquid-steam penetration ducts are provided for the secondary fluid in the immediate vicinity of the circulator.

However, the construction of these equipment units by means of two steam generator and circulator sets in superposed and symmetrical relation is such that the operational potentialities of this type of reactor are considerably enhanced. In the first place and in regard to the structural design of the reactor, the arrangements employed make it possible in respect of equal power levels to make use of a concrete pressure vessel which has even smaller dimensions and especially which permits a reduction in diameter and in weight, with the result that the construction of said vessel is easier and less complex. In particular, provision can be made for pods which are appreciably smaller both in diameter and number than in the solutions of the prior art and the concrete can thus be put to more effective use. In any case, the required number is smaller than in conventional designs since each pod contains two steam-generator and circulator sets instead of one.

Similarly, the number of collector ducts or headers for the hot primary fluid as well as the volume occupied by this fluid are also reduced since only a single duct of small length serves to supply each pod and two separate steam generators within this latter. These arrangements also permit greater relative spacing in plan both of the headers and of the pods which are connected by these latter to the cavity of the reactor core. Positioning of the structures required for the purpose of supporting the pressure vessel at the bottom end of this latter can thus be carried out more easily. The foundations can be lightened, with the result that the weight gain of the reactor provides ample compensation for a certain increase in the height of the support columns or walls.

In regard to the design of the primary fluid circuits or loops, the arrangements of the invention also provide a large number of advantages. In particular, the increase in the number of heat exchangers and associated circulators corresponding to an appreciable reduction in the total weight of these element is particularly favorable to operation at very low loads. In this case, the heat-exchanger and circulator sets which are mounted in the upper portions of the pods can be withdrawn from service without any difficulty and only the lower sets are accordingly employed. By virtue of the arrangement in which they are placed beneath the reactor core and connected to the hot primary-fluid header, said lower sets produce a downward circulation of said primary fluid and consequently an upward circulation of secondary fluid in the natural direction of vaporization. The operation of the lower sets within the pods ensures appreciable stability of operation and satisfactory performance even in transient states and makes it possible to set the minimum permissible operating power at a relatively very low value.

The arrangements which are contemplated also permit the possibility of dispensing with the emergency cooling loops provided in conventional reactors. In fact, the lower heat-exchanger and circulator sets of the different pods which surround the reactor core cavity are capable of performing this function directly by virture of their constructional design, their flexibility of use, their favorable arrangement in cases of transient operation or of natural convection phenomena. Moreover, the circulators which are associated with the heat exchangers can be of relatively small size and can accordingly be equipped with more suitable emergency driving means designed for operation even at excess speed. Since these lower heat-exchanger and circulator sets operate continuously, this has the further result of avoiding certain restrictive conditions arising from abrupt starting and stopping which would otherwise be necessary.

The equipment of the energy recovery installation which is associated with the reactor under consideration can also be designed in different ways in accordance with the invention. This installation can comprise either a single turbo-alternator or two sets of turbo-alternators connected in one case to the series of lower cooling loops and in the other case to the series of upper cooling loops. In particular, provision can be made for the use, either of two sets having similar power ratings and supplied by a steam circuit which is common to the two steam-generator and circulator sets in all the pods of two separate circuits connected in one case to the upper heat exchangers and in the other case to the lower heat exchangers or, finally, of a main set having a high power rating and one or a plurality of sets of substantially lower power supplied by part of the lower heat exchangers, the power derived from the reactor being distributed at will between the different upper and lower sets within the pods.

Further advantages will result from the arrangements which are contemplated, especially from the direct passage of the hot primary fluid through the tube bundles of the heat exchangers and the return of the cooled fluid at overpressure within a space in contact with the pressure vessel wall, either within each pod or even within the main cavity of the reactor core, which is particularly helpful in maintaining said walls at a low temperature while limiting the differential expansions of these latter and of associated structures. The lower portion of each pod can readily be arranged in particular with a view to providing a direct support within a zone of cold fluid at overpressure for the heat exchanger of the lower set whilst the heat exchanger of the upper set can also be suspended in a zone of a cold fluid at overpressure without giving rise to any particular problems. Moreover, the arrangement of the heat exchangers in which provision is preferably not made for any internal steam resuperheating circuit results in minimum pressure drops in the case of the primary fluid and especially that portion of its flow path which passes through the pods. This is explained by the fact that there is no need whatever to correct the direction of flow since the evaporation of the secondary fluid within the heat exchanger of the lower set takes place in the normal direction and is in the opposite direction only within the heat exchanger of the upper set.

The overall results thereby achieved are high reliability, enhanced flexibility of operation and especially a greater possibility of extrapolation to very high powers with operating costs which increase in a substantially reduced proportion.

Finally, the constructional arrangements which are contemplated permit both storage and conditioning within the interior of the biological shield structure or pressure vessel. While offering substantial advantages from a safety standpoint, this possibility leads to considerable simplification and to appreciable reduction in the dimensions of the reactor containment building. Moreover, by bringing to the vicinity of ground level the plane of translation of the heavy components of the reactor equipment such as the heat exchangers and handling machines, for example, another appreciable advantage is gained.

As has already been brought out by the foregoing, the invention is clearly not limited solely to the examples of construction which have been described with reference to the accompanying drawings but extends to all alternative forms.

What we claim is:

1. A nuclear reactor and especially a high temperature reactor in which provision is made within a vessel which forms a biological shield structure and affords resistance to the pressure of a primary fluid for a main cavity containing a reactor core and a series of vertical cylindrical pods extending through said vessel and arranged in spaced relation around the main cavity, each pod being adapted to communicate with said main cavity through two headers for a primary fluid which flows downwards through the reactor core, the opening of a hot-fluid header being located substantially at the center of each pod, a cold fluid header being located at the top of each pod, wherein each pod contains two superposed steam generator and circulator sets placed in substantially symmetrical relation on each side of said hot primary-fluid header which conveys said fluid from the reactor cavity to the pod, and circulators for both sets being mounted respectively at the bottom and top ends of said pod.

2. A nuclear reactor in accordance with claim 1, wherein the circulator which is mounted at the bottom end of the pod returns the primary fluid after said fluid has passed through the steam generator which is associated therewith in the same set into an annular space formed between said steam generator and the internal wall of said pod.

3. A nuclear reactor in accordance with claim 2, wherein the annular space through which the primary fluid flows after being returned by the circulator mounted at the bottom end of the pod communicates with a duct which surrounds the hot primary-fluid header, said header being in turn adapted to communicate through the region formed between the periphery of the reactor core and the pressure vessel wall with the upper portion of the main cavity above said core substantially at the level of the header for the cold primary fluid which is derived from the upper portion of said pod.

4. A nuclear reactor in accordance with claim 2, wherein the annular space communicates within the pod with a similar annular space formed between the pod wall and the steam generator of the upper set, the primary fluid which is circulated within said annular spaces being mixed with the fluid which is returned by the circulator mounted at the top end of the pod before passing into the cold primary-fluid header.

5. A nuclear reactor in accordance with claim 1, wherein each steam generator comprises a heat exchanger formed by a bundle of circulation tubes joined to a sub-header for the supply of secondary fluid and to a sub-header for sub-headers discharge of steam produced by the secondary fluid, said subheaders being disposed vertically around the circulator which is associated with the steam generator in each set.

6. A nuclear reactor in accordance with claim 1, wherein the two steam-generator and circulator sets of each pod form in conjunction with the hot and cold primary-fluid headers two separate circuits which operate in parallel, the circulator which is mounted at the top end of the pod and if necessary the circulator which is mounted at the bottom end being provided with a closure and aerodynamic control device in order that the primary fluid should be prevented from flowing in the opposite direction into the loop which has been withdrawn from service at the time of shutdown of the upper steam-generator and circulator set.

7. A nuclear reactor in accordance with claim 1, wherein said reactor is provided within the pressure vessel and beneath the main cavity with a sub-core room reserved for storage and conditioning of fuel elements for the reactor core.

* * * * *